United States Patent
Rajalingam et al.

(10) Patent No.: US 9,507,546 B2
(45) Date of Patent: Nov. 29, 2016

(54) METHOD FOR PRODUCING PACKAGES OF PRINTED MATERIALS BY GENERATING AND EXECUTING A JOB SET CONTAINING MULTIPLE LINKED SUB-JOBS

(71) Applicant: KONICA MINOLTA LABORATORY U.S.A., INC., San Mateo, CA (US)

(72) Inventors: Sivaraman Rajalingam, Fremont, CA (US); Danny Naoshi Kumamoto, Garden Grove, CA (US); Hidetaka Yoshida, San Mateo, CA (US); Rakesh Pandit, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/632,992

(22) Filed: Feb. 26, 2015

(65) Prior Publication Data
US 2016/0253130 A1    Sep. 1, 2016

(51) Int. Cl.
G06F 3/12    (2006.01)

(52) U.S. Cl.
CPC .......... *G06F 3/1205* (2013.01); *G06F 3/1262* (2013.01)

(58) Field of Classification Search
None
See application file for complete search history.

(56) References Cited

U.S. PATENT DOCUMENTS

| | | | | |
|---|---|---|---|---|
| 5,715,381 A * | 2/1998 | Hamilton | .............. | G06F 3/1204 358/1.15 |
| 6,501,559 B1* | 12/2002 | Salgado | ................ | G06F 9/5044 358/1.14 |
| 6,570,670 B1* | 5/2003 | Salgado | ................ | G06F 9/4843 358/1.15 |
| 6,614,542 B1* | 9/2003 | Salgado | ................ | G06F 3/1204 358/1.12 |
| 6,651,081 B1* | 11/2003 | Salgado | ................ | G06F 9/5044 358/1.14 |
| 6,671,065 B1* | 12/2003 | Salgado | ................ | G06F 9/5011 358/1.15 |
| 6,717,690 B1* | 4/2004 | Salgado | ............. | H04N 1/00915 358/1.14 |
| 6,762,857 B1* | 7/2004 | Salgado | ............. | H04N 1/00915 358/1.15 |
| 6,827,514 B1* | 12/2004 | Shima | ................... | G06F 3/1208 400/582 |
| 7,755,778 B2* | 7/2010 | Rai | ........................ | G06F 3/1214 358/1.1 |
| 9,164,811 B1* | 10/2015 | Valeriano | .............. | G06F 3/1296 |

(Continued)

*Primary Examiner* — Ted Barnes
(74) *Attorney, Agent, or Firm* — Chen Yoshimura LLP

(57) ABSTRACT

A method for producing packages of printed materials arranged in order based on multiple original digital documents. A user interface is provided to allow the user to specify the order of the original documents to be printed. A print server generates multiple sub-jobs which contain linking information that links them to each other in the specified order to form a job set. The job set can be submitted to a printer in one submission. A printer executes the linked sub-jobs sequentially based on the linking information contained in the sub-jobs to produce the multiple printed documents in the specified order.

12 Claims, 3 Drawing Sheets

(56) References Cited

U.S. PATENT DOCUMENTS

| | | | |
|---|---|---|---|
| 2003/0058468 A1* | 3/2003 | Couwenberg | G06F 3/1205 358/1.13 |
| 2004/0187113 A1* | 9/2004 | Viassolo | G06F 9/505 718/100 |
| 2006/0139679 A1* | 6/2006 | Barry | G06F 3/1212 358/1.13 |
| 2007/0229878 A1* | 10/2007 | Pandit | G06F 3/1207 358/1.15 |
| 2007/0229880 A1* | 10/2007 | Harmon | G06F 3/1205 358/1.15 |
| 2007/0229883 A1* | 10/2007 | Fujimori | G06F 3/1208 358/1.15 |
| 2007/0229895 A1* | 10/2007 | Fujimori | G06F 3/1208 358/1.16 |
| 2007/0229896 A1* | 10/2007 | Fujimori | G06F 3/1205 358/1.16 |
| 2007/0236725 A1* | 10/2007 | Harmon | G06F 3/1204 358/1.15 |
| 2007/0242303 A1* | 10/2007 | Barry | G06F 3/1212 358/1.15 |
| 2009/0147296 A1* | 6/2009 | Pandit | G03G 21/02 358/1.15 |
| 2009/0201531 A1* | 8/2009 | Pandit | G06Q 10/06 358/1.15 |
| 2009/0217268 A1* | 8/2009 | Pandit | G06F 3/1288 718/100 |
| 2010/0118338 A1* | 5/2010 | Sakiyama | H04N 1/00411 358/1.15 |
| 2010/0157368 A1* | 6/2010 | Harmon | G06F 3/1204 358/1.15 |
| 2010/0188700 A1* | 7/2010 | Fujimori | G06F 3/1205 358/1.15 |
| 2010/0245884 A1* | 9/2010 | Komine | G06F 3/1255 358/1.15 |
| 2011/0216340 A1* | 9/2011 | Yoshida | G06F 3/1205 358/1.13 |
| 2012/0042323 A1* | 2/2012 | Sekiguchi | G06F 9/5072 718/106 |
| 2012/0081720 A1* | 4/2012 | Pandit | G06F 3/1206 358/1.9 |
| 2012/0081737 A1* | 4/2012 | Pandit | G06F 3/1205 358/1.15 |
| 2012/0250053 A1* | 10/2012 | Mitsubori | G06F 3/1213 358/1.13 |
| 2012/0307301 A1* | 12/2012 | Otomaru | G03G 15/5083 358/1.15 |
| 2012/0320405 A1* | 12/2012 | Giannetti | G06F 3/1207 358/1.15 |
| 2013/0222845 A1* | 8/2013 | Chapin | G06Q 10/06 358/1.15 |
| 2015/0057784 A1* | 2/2015 | Butler | B29C 67/0088 700/119 |

* cited by examiner

METHOD FOR PRODUCING PACKAGES OF PRINTED MATERIALS BY GENERATING AND EXECUTING A JOB SET CONTAINING MULTIPLE LINKED SUB-JOBS

BACKGROUND OF THE INVENTION

Field of the Invention

This invention relates to a method for managing printing of documents, and in particular, it relates to a method of printing multiple documents in order to produce packages of printed materials.

Description of Related Art

In practice there are often situations when multiple separate original digital documents need to be printed and assembled in predetermined orders to produce a package or set of printed materials. The required print setting (including finishing settings) for the multiple original documents may be different, for example, in terms of paper type and size, single or double sided printing, finishing requirements such as folding and stapling, etc. If multiple sets (i.e. copy count) is required, then multiple copies of the original documents need to be printed and assembled into sets. For example, a manufacturer of a product may need to produce a set of documents, all of which are printed individually and then assembled in a package and put in a single plastic sleeve to be delivered with the product. In a traditional print environment, such a print job would involve multiple different source files (e.g. Portable Document Format or PDF files), each of which would need to be sent to a printer as a separate print job (or sub-job), printed, finished and then combined with the other sub-jobs and inserted into a plastic sleeve for inclusion in the product packaging. It is possible for the user to send multiple print jobs to a printer sequentially to produce the set of printed materials, but such a method can be burdensome when multiple sets are produced.

SUMMARY

The present invention is directed to a method for producing packages of printed materials that substantially obviates one or more of the problems due to limitations and disadvantages of the related art.

An object of the present invention is to provide a simplified method to produce packages of printed materials containing an ordered set of multiple documents with diverse print settings.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented on a print server which is connected to a printer, for producing a package of printed documents from multiple original digital documents, which includes: (a) receiving user inputs that specify a plurality of original digital documents to be printed in a specified order as a job set, the user inputs further specifying print settings for each of the plurality of original digital document; (b) receiving user inputs that specify a plurality of additional print settings for the job set; (c) generating a plurality of sub-job tickets, each sub-job ticket corresponding to one of the original digital documents and being generated in accordance with the print settings for the corresponding original digital document received in step (a), wherein each original digital document and the corresponding sub-job ticket form a sub-job having a sub-job ID, wherein each sub-job ticket further includes: a package tag indicating that the sub-job is a part of the job set, and a next sub-job ID parameter specifying a sub-job ID of a next sub-job of the job set, wherein the next sub-job ID parameter in a sub-job ticket of a last sub-job of the job set specifies a sub-job ID of a first sub-job of the job set, and wherein a sub-job ticket for the first sub-job further includes a parameter indicating that the sub-job is the first sub-job of the job set; (d) in response to an input received from the user to submit the job set to a printer, transmitting all sub-jobs in the job set to the printer.

In another aspect, the present invention provides a method implemented on a printer for executing a plurality of sub-jobs, which includes: (a) receiving a plurality of sub-jobs of a job set and storing them in a memory, each sub-job having a sub-job ID and including a digital document and a corresponding sub-job ticket, each sub-job ticket including a plurality of parameters specifying print settings for printing the corresponding digital document, wherein each sub-job ticket further includes: a package tag indicating that the sub-job is a part of the job set, and a next sub-job ID parameter specifying a sub-job ID of a next sub-job of the job set, wherein the next sub-job ID parameter in a sub-job ticket of a last sub-job of the job set specifies a sub-job ID of a first sub-job of the job set, and wherein a sub-job ticket for the first sub-job further includes a first indicator indicating that the sub-job is the first sub-job of the job set; (b) retrieving one of the sub-jobs from the memory and setting it as a current sub-job having a current sub-job ticket; (c) obtaining the sub-job ID of the next sub-job of the job set from the next sub-job ID parameter in the current sub-job ticket; (d) printing the digital document of the current sub-job according to the print settings in the current sub-job ticket; (e) retrieving a sub-job from the memory using the sub-job ID of the next sub-job obtained in step (c), and setting the retrieved sub-job as the current sub-job; and repeating steps (c), (d) and (e).

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 1 illustrates a process performed by a print server, and FIG. 2 illustrates a process performed by a printer.

DETAILED DESCRIPTION OF PREFERRED EMBODIMENTS

Embodiments of the present invention provides a method for producing packages of printed materials arranged in order based on multiple original digital documents. A print server generates multiple sub-jobs which contain linking information that links them to each other in a specified order to form a job set. A user interface is provided to allow the user to specify the order of the original documents to be printed. The user can submit the job set to a printer in one submission instead of submitting multiple print jobs. A printer executes the linked sub-jobs sequentially, based on the linking information contained in the sub-jobs, to produce the multiple printed documents in the specified order.

Figure 4:
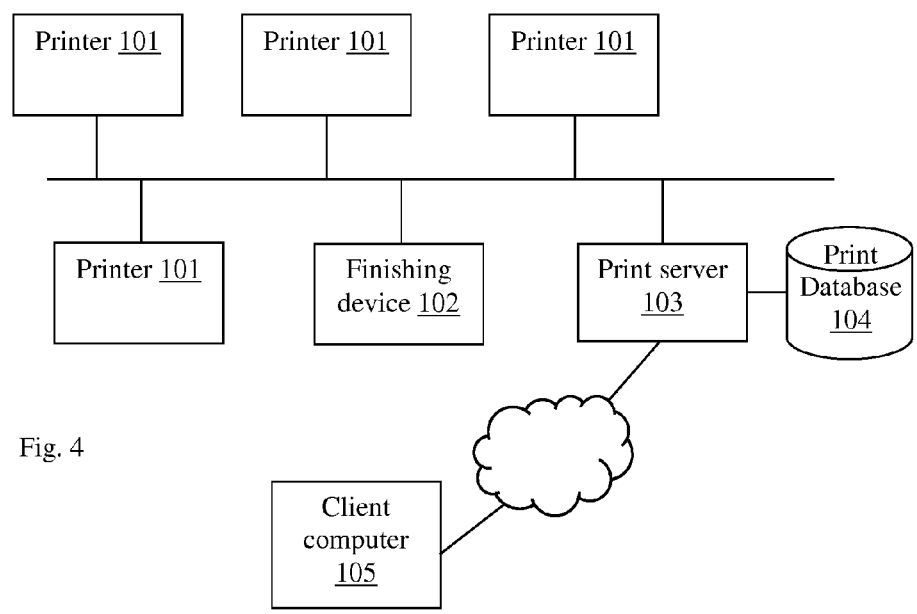
FIG. 4 schematically illustrates a printing system in which embodiments of the present invention may be implemented.

FIG. 4 schematically illustrates a printing system that may be used to implement embodiments of the present invention. The system includes one or more printers 101 (which may have certain build-in finishing functions such as stapling, hole punching, etc.), optional finishing devices 102, and a print server 103 connected to each other by a network. The print server 103 maintains a database 104 that stores various data including digital documents, print job tickets, etc. One or more client computers 105 communicates with the print server 103 via a network such as the internet to allow the user to place print orders. Each printer has a print engine and a printer controller that includes memory and processor(s) (not shown in the drawings). The method described here may be implemented by software programs stored in a memory and executed by processors of the server 103 (not shown in the drawings), and software programs stored in a memory and executed by processors of the printer controller of printer 101.

Figure 1:
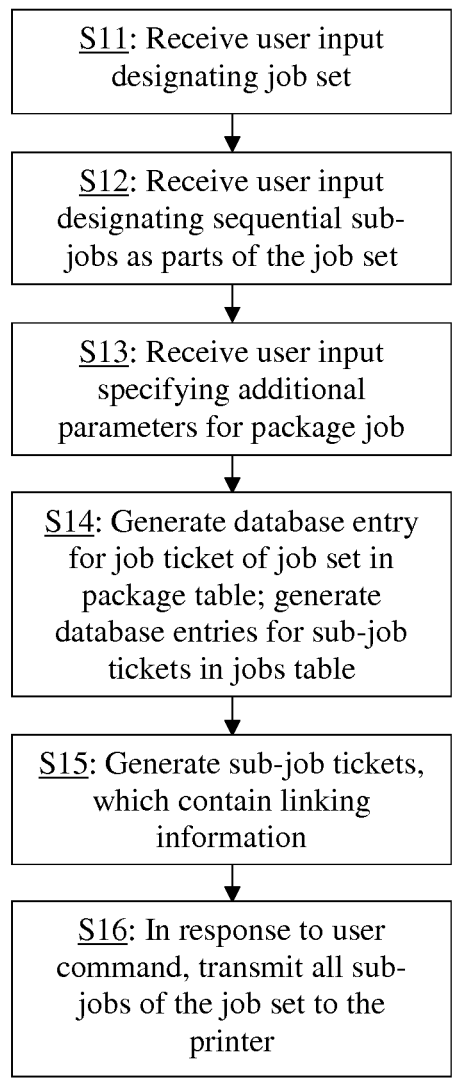
FIGS. 1 and 2 schematically illustrate a method for producing packages of printed materials according to an embodiment of the present invention.
Figure 2:
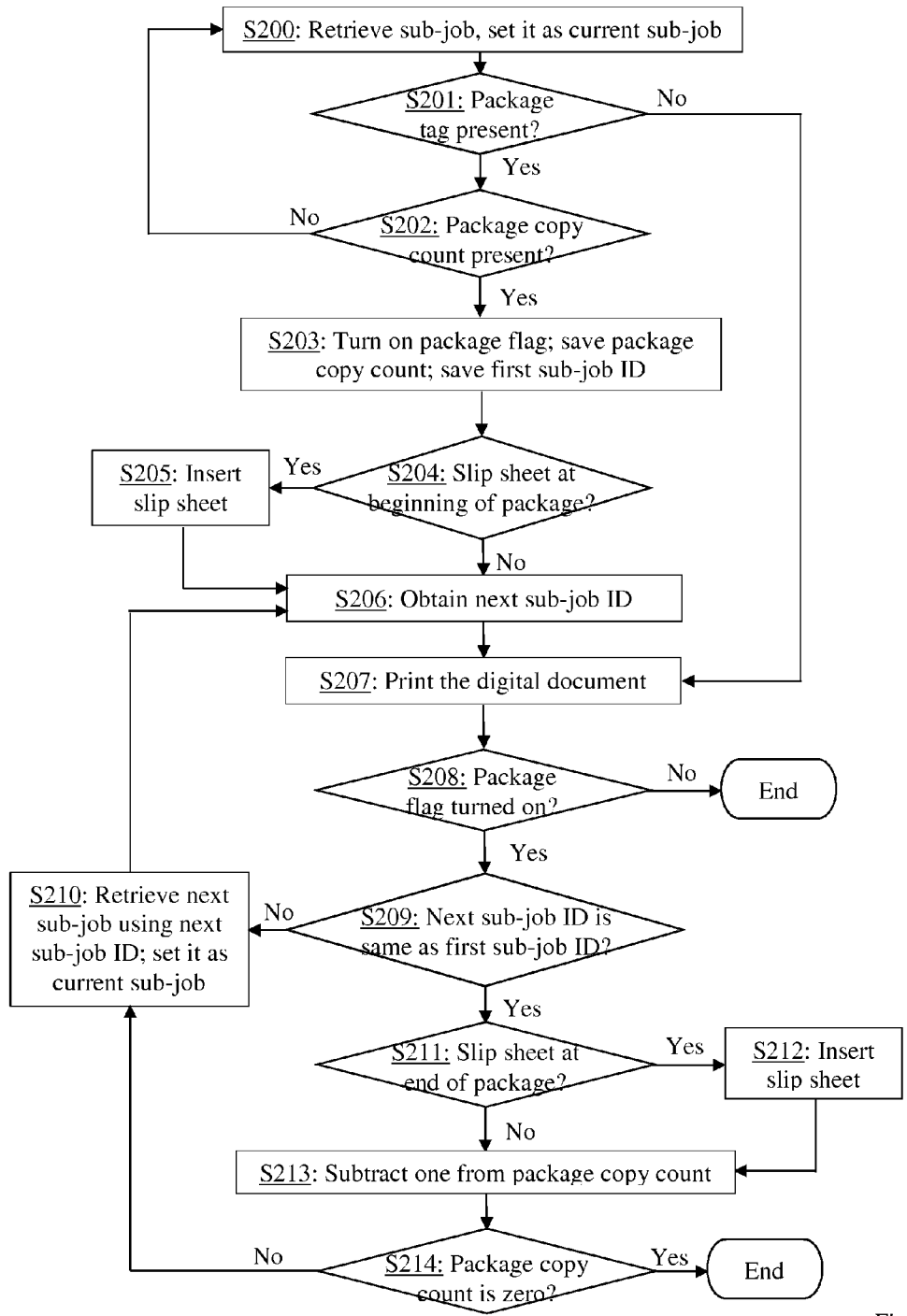

FIGS. 1 and 2 schematically illustrates a method of producing a package of printed materials according to an embodiment of the present invention. FIG. 1 illustrates the process performed by the print server, and FIG. 2 illustrates the process performed by a printer. In this embodiment, a job set containing multiple linked sub-jobs is created by the server and executed by the printer. The method can automatically maintain the order of the various sub-jobs to be printed. The multiple sub-jobs are submitted to the printer as one set, so that the user does not have to submit the sub-job individually to the printer. The documents are printed in the specified order by the printer and can be easily picked up by the user.

Referring to FIG. 1, using a graphical user interface (GUI) provided by the server, the user designates a job set (also referred to as a package) (step S11), and designates sequential sub-jobs that will be parts of the job set (step S12). A sub-job may be designated a number of ways. One way is to specify an existing print job, which includes both the document to be printed (e.g. a PDF document) and an associated job ticket, as a sub-job. The existing job ticket specifies the print settings for this sub-job. The GUI may provide the ability for the user to manually modify the existing job ticket to change some of the print settings as desired. Another way is to specify a document, and manually specify the print settings for this document, to form a sub-job, in a manner similar to when the user creates a normal print job. The GUI also provide the ability for the user to re-order the sub-jobs of the job set as desired.

The user further specifies certain additional parameters for the job set (step S13), including at least the following parameters: copy count for the job set (i.e. the number of copies of the set to be produced); whether a slip sheet(s) is to be inserted at the beginning of each set of printed materials, such as a banner page; and whether a slip sheet(s) is to be inserted at the end of each set of printed materials.

The print settings for the job set and its sub-jobs are stored in the print database 104 on the server 103. For example, the server creates a database entry for each job set in a package table, and creates database entries for the sub-job tickets in a jobs table (step S14). The jobs table may be the same jobs table that contains other job tickets of normal print jobs that are not a part of a job set.

In one example, each database entry in the package table contains the following parameters: package ID, package name, package print status, package priority, number of sub-jobs in the package, etc. In one example, each database entry for a sub-job of a job set contains the following parameters: job ticket ID; job ticket name; job status; number of copies for the job; print setting parameters such as paper settings, layout settings, finishing settings, etc., and package ID of the job set it belongs to (i.e. the foreign key). Note that either the job ticket name or job ticket ID can be used to identify a job or sub-job; typically, the ID is generated by the server and the name is assigned by the user. In the description below, the term "job ID" or "sub-job ID" generally refers to a unique identifier for a job or sub-job, which may be either the job ticket name or job ticket ID.

The server generates sub-job tickets for the sub-jobs of the job set (step S15). (Note that if an existing print job was used to designate a sub-job, the existing job ticket should not be altered, and a sub-job ticket should be generated based on the existing job ticket.) In addition to the job setting parameters normally present in a job ticket, the sub-job tickets contain additional parameters as follows. A package tag, which indicates that the sub-job is a part of a job set (package), is added to all sub-job tickets. A next sub-job ID parameter is also added to all sub-job tickets, which specifies the sub-job ID of the next sub-job of the job set, except that in the last sub-job ticket, the next sub-job ID parameter specifies the sub-job ID of the first sub-job. In the first sub-job ticket, the copy count of the job set (package copy count) and an indication of whether any cover slip sheet is to be inserted at the beginning of the first sub-job are added. The first sub-job ticket may also include a parameter indicating the number of sub-jobs in the job set. In addition, the first sub-job ticket may includes a tag indicating that the sub-job is the first sub-job of the job set, and the other sub-job tickets may includes a tag indicating that the sub-job is not the first sub-job of the job set. In the last sub-job ticket, an indication of whether any slip sheet is to be inserted at the end of the last sub-job is added.

Figure 3:
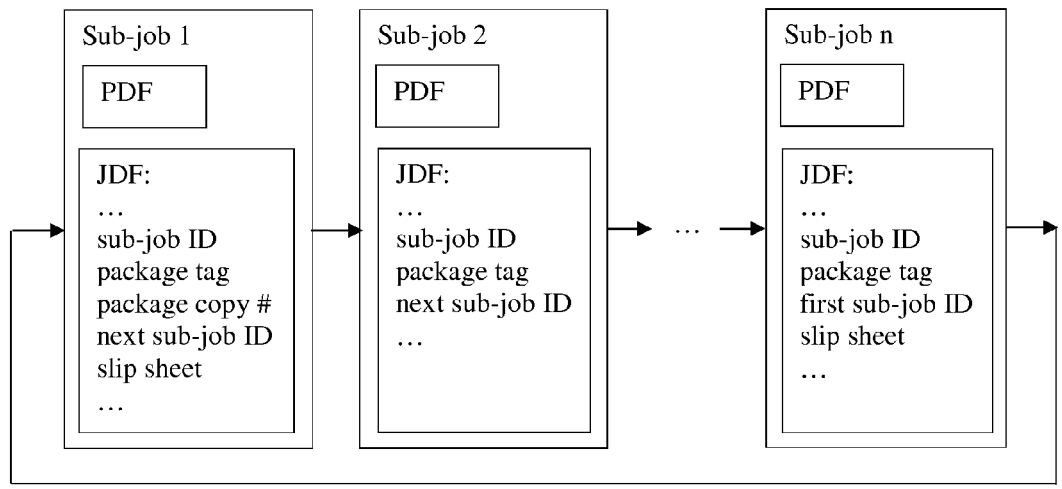
FIG. 3 schematically illustrates an ordered set of sub-jobs linked to each other forming a job set.

FIG. 3 schematically illustrates an ordered set of sub-jobs linked to each other forming a job set. Each sub-job includes a digital document (PDF in this example) and the associated sub-job ticket (JDF in this example). The sub-job tickets for the first, second, . . . and last sub-jobs are shown as having different additional parameters as described above. In the sub-job tickets, the next sub-job ID parameter serves as linking information that links the multiple sub-jobs in a desired sequence forming a job set. The arrows in FIG. 3 schematically show the linking of the sub-jobs.

An example of relevant parameters of the first sub-job ticket is shown below:

```
<kmbs:packaging kmbs:thisjob="ac_package_subjob_1"
kmbs:copy="1" kmbs:nextjobid="ac_package_subjob_2"
kmbs:subjobtype="head"
kmsb:numberofsubjobsinpackage = "3"
kmbs:front_slipsheet_count="1" kmbs:front_slipsheet_tray="1">
```

An example of relevant parameters of the second through next-to-last sub-job ticket is shown below:

```
<kmbs:packaging kmbs:thisjob="ac_package_subjob_2"
kmbs_subjobtype="secondary" kmbs:nextjobid=
"ac_package_subjob_3">
```

An example of relevant parameters of the last sub-job ticket is shown below:

```
<kmbs:packaging kmbs:thisjob="ac_package_subjob_3"
kmbs:nextjobid="ac_package_subjob_1" kmbs_subjobtype=
"secondary"
kmbs:back_slipsheet_count="1" kmbs:back_slipsheet_tray="1">
```

In the above examples, the parameter "kmbs:subjobtype="head"" is a tag indicating that this sub-job is the first sub-job ("head") of the job set, while "kmbs_subjobtype="secondary"" indicates that this sub-job is not the first sub-job of the job set. The parameter "kmsb:numberofsubjobsinpackage="3"" in the first sub-job ticket indicates the number of sub-jobs in the job set.

When the user issues a command to submit the job set to a printer, the server transmits all of the sub-jobs belonging to the job set to the printer (and any finishing devices if necessary) (step S16). The sequence in which the sub-jobs are transmitted to the printer is not important; the order integrity of the sub-jobs within the job set is realized at the time of printing as described below. As a result, the user does not need to manually submit each sub-job individually to the printer.

FIG. 2 illustrates a process performed by the printer controller when executing a sub-job (or a normal print job). The sub-jobs or print jobs have been received from the print server and stored in the memory of the printer controller. After retrieving a sub-job (or a normal print job) from the memory (step S200), the printer controller first examines the sub-job ticket and checks for a package tag to determine whether the job is a normal print job or a sub-job of a job set (step S201). If the job is a normal print job ("No" in step S201), it is printed normally (step S207, described later).

If a package tag is present ("Yes" in step S201), indicating that the job is a sub-job of a job set, the printer controller looks for the package copy count parameter in the sub-job ticket to determine whether the sub-job is the first sub-job of the job set (step S202). In other words, the package copy count parameter is used as an indication that the current sub-job is the first sub-job of the job set, because only the first sub-job ticket contains this parameter. Alternatively, instead of using the package copy count parameter, an additional indicator may be added to the first sub-job ticket (in step S15) to indicate that it is the first sub-job, in which case the printer controller will look for this indicator in step S202. If the sub-job is not the first sub-job ("head job") ("No" in step S202), the sub-job is ignored and the controller will wait. If it is the first sub-job ("Yes" in step S202), the printer controller turns on an internal package flag, saves the package copy count number, and saves the sub-job ID of this sub-job (the first sub-job ID) (step S203).

The printer controller then checks the sub-job ticket to determine whether a slip sheet is required at the beginning of the package (step S204), and sends a slip sheet to the output tray if it is required (step S205).

The printer controller obtains the next sub-job ID from the current sub-job ticket (step S206). It then executes the current sub-job normally to print the digital document of the sub-job (step S207). Step S207 may include, for example, interpreting the print setting parameters of the sub-job ticket, processing the digital document, rendering the raster image, etc.

After the sub-job is executed, if the package flag is not set (e.g. the flow has gone from step S201 directly to step S207) ("No" in step S208), the process ends. Otherwise ("Yes" in step S208), the printer controller determines whether the next sub-job ID previously obtained in step S206 is the same as the first sub-job ID previously saved in step S203 (step S209). If they are not the same ("No" in step S209), the printer controller retrieves the next sub-job from its memory using the next sub-job ID and sets it as the current sub-job (step S210), and returns to step S206.

If in step S209 the next sub-job ID is the same as the first sub-job ID ("Yes" in step S209), it means that the current sub-job is the last sub-job; the printer controller checks the sub-job ticket to determine whether a slip sheet required at the beginning of the package (step S211), and sends a slip sheet to the output tray if it is required (step S212).

The printer controller then subtracts one from the package copy count (step S213). If the package copy count is now zero ("Yes" in step S214), the process ends; otherwise the print controller retrieves the next sub-job (which will be the first sub-job) from its memory and sets it as the current sub-job (step S210), and returns to step S206 to produce the next set of printed materials.

In the above described embodiment, the job ticket may be in any suitable job ticket format, such as JDF (Job Definition Format), Print Production Format (PPF), Portable Job Ticket Format (PJTF), etc. The digital document may be in any suitable format, such as PDF.

Because the multiple sub-jobs may have diverse finishing requirements, and all sub-jobs are required to be outputted to the same output tray in order to produce the multiple documents in the desired order, the printer will be required to have the ability to output printed documents having different finishing (in particular, different binding) to the same output tray. Alternatively, there may be a dedicated packaged output tray to handle the package job output such that other jobs can be inter-mixed and sent to the non-package output trays. This way, if the packaged job has normal priority and higher priority non-package job has to be printed, the new job can be introduced without impacting the package job creation process. A third alternative is that there may be an external finisher system which will collect the outputs from more than one output tray and combine the outputs into one package. As long as this external finisher is integrated with print controller, a high priority job can be accommodated in the same manner as in the second alternative above.

As seen from the above descriptions, embodiments of the present invention provide the ability to generate a job set that links multiple sub-jobs having the various print settings together which can be submitted to and printed on one printer (and finishing devices if necessary) so that they are printed in the specified sequence for each package. Using the slip sheet(s) at the beginning and end of the package job, the user can easily separate the multiple sets of documents into separate packages.

An advantage of the printing method is that each job set (package) will be printed in the correct order, as a single job submission as far as the user is concerned, and importantly, while maintaining the different printing/finishing requirements of each sub-job. Multiple copies of each set can be easily be printed or reprinted, while ensuring that the correct order is preserved and the printed documents easily removed as a set from the printer. Alternatively, this finisher may package each job set into, for example, a plastic bag such that no manual intervention is required to create the expected output.

It will be apparent to those skilled in the art that various modification and variations can be made in the printing method of the present invention without departing from the spirit or scope of the invention. Thus, it is intended that the present invention cover modifications and variations that come within the scope of the appended claims and their equivalents.

What is claimed is:

1. A method implemented on a print server which is connected to a printer, for producing a package of printed documents from multiple original digital documents, comprising:
   (a) receiving user inputs that specify a plurality of original digital documents to be printed in a specified order as a job set, the user inputs further specifying print settings for each of the plurality of original digital documents;
   (b) receiving user inputs that specify a plurality of additional print settings for the job set;
   (c) generating a plurality of sub-job tickets, each sub-job ticket corresponding to one of the original digital documents and being generated in accordance with the print settings for the corresponding original digital document received in step (a), wherein each original digital document and the corresponding sub-job ticket form a sub-job having a sub-job ID,
   wherein each sub-job ticket further includes: a package tag indicating that the sub-job is a part of the job set, and a next sub-job ID parameter specifying a sub-job ID of a next sub-job of the job set, wherein the next sub-job ID parameter in a sub-job ticket of a last sub-job of the job set specifies a sub-job ID of a first sub-job of the job set, and wherein a sub-job ticket for the first sub-job further includes a parameter indicating that the sub-job is the first sub-job of the job set; and
   (d) in response to an input received from the user to submit the job set to the printer, transmitting all sub-jobs in the job set to the printer.

2. The method of claim 1, wherein in step (a) the user inputs specify an existing print job as a sub-job, the print job including a digital document which is one of the plurality of original digital documents and an existing job ticket which contains print settings for that original digital document, and wherein in step (c), the sub-job ticket for that sub-job is generated based on the existing job ticket.

3. The method of claim 1, wherein in step (a) the user inputs further modify the print settings contained in the existing job ticket.

4. The method of claim 1, wherein the additional print settings for the job set include a slip sheet setting indicating whether a slip sheet is to be inserted at a beginning of the job set,
   wherein in step (c), the sub-job ticket for the first sub-job further includes a parameter indicating that a slip sheet is to be inserted at a beginning of the first sub-job.

5. The method of claim 1, wherein the additional print settings for the job set include a slip sheet setting indicating whether a slip sheet is to be inserted at an end of the job set, wherein in step (c), the sub-job ticket for the last sub-job further includes a parameter indicating that a slip sheet is to be inserted at an end of the sub-job.

6. The method of claim 1, wherein the additional print settings for the job set include a package copy count setting indicating a number of copies of the job set to be printed, and wherein the parameter in the first sub-job ticket that indicates that the sub-job is the first sub-job of the job set is the package copy count setting.

7. A computer program product comprising a computer usable non-transitory medium having a computer readable program code embedded therein for controlling a print server, the print server being connected to a printer, the computer readable program code configured to cause the print server to execute a process for producing a package of printed documents from multiple original digital documents, the process comprising:
   (a) receiving user inputs that specify a plurality of original digital documents to be printed in a specified order as a job set, the user inputs further specifying print settings for each of the plurality of original digital documents;
   (b) receiving user inputs that specify a plurality of additional print settings for the job set;
   (c) generating a plurality of sub-job tickets, each sub-job ticket corresponding to one of the original digital documents and being generated in accordance with the print settings for the corresponding original digital document received in step (a), wherein each original digital document and the corresponding sub-job ticket form a sub-job having a sub-job ID,
   wherein each sub-job ticket further includes: a package tag indicating that the sub-job is a part of the job set, and a next sub-job ID parameter specifying a sub-job ID of a next sub-job of the job set, wherein the next sub-job ID parameter in a sub-job ticket of a last sub-job of the job set specifies a sub-job ID of a first sub-job of the job set, and wherein a sub-job ticket for the first sub-job further includes a parameter indicating that the sub-job is the first sub-job of the job set; and
   (d) in response to an input received from the user to submit the job set to the printer, transmitting all sub-jobs in the job set to the printer.

8. The computer program product of claim 7, wherein in step (a) the user inputs specify an existing print job as a sub-job, the print job including a digital document which is one of the plurality of original digital documents and an existing job ticket which contains print settings for that original digital document, and wherein in step (c), the sub-job ticket for that sub-job is generated based on the existing job ticket.

9. The computer program product of claim 7, wherein in step (a) the user inputs further modify the print settings contained in the existing job ticket.

10. The computer program product of claim 7, wherein the additional print settings for the job set include a slip sheet setting indicating whether a slip sheet is to be inserted at a beginning of the job set,
    wherein in step (c), the sub-job ticket for the first sub-job further includes a parameter indicating that a slip sheet is to be inserted at a beginning of the first sub-job.

11. The computer program product of claim 7, wherein the additional print settings for the job set include a slip sheet setting indicating whether a slip sheet is to be inserted at an end of the job set,
    wherein in step (c), the sub-job ticket for the last sub-job further includes a parameter indicating that a slip sheet is to be inserted at an end of the sub-job.

12. The computer program product of claim 7, wherein the additional print settings for the job set include a package copy count setting indicating a number of copies of the job set to be printed, and wherein the parameter in the first sub-job ticket that indicates that the sub-job is the first sub-job of the job set is the package copy count setting.

* * * * *